(12) United States Patent
Chen et al.

(10) Patent No.: US 11,174,971 B2
(45) Date of Patent: Nov. 16, 2021

(54) SEAL

(71) Applicant: Millennium Coupling Company Pty Ltd, South Australia (AU)

(72) Inventors: TsanJee Chen, Taipei (TW); Simon Tape, South Australia (AU)

(73) Assignee: Millennium Coupling Company Pty Ltd, South Australia (AU)

( * ) Notice: Subject to any disclaimer, the term of this patent is extended or adjusted under 35 U.S.C. 154(b) by 0 days.

(21) Appl. No.: 16/659,112

(22) Filed: Oct. 21, 2019

(65) Prior Publication Data

US 2020/0049286 A1 Feb. 13, 2020

Related U.S. Application Data

(63) Continuation of application No. 15/348,424, filed on Nov. 10, 2016, now abandoned.

(30) Foreign Application Priority Data

Nov. 11, 2015 (AU) .................. 2015904645

(51) Int. Cl.
| | | |
|---|---|---|
| *F16L 23/22* | (2006.01) | |
| *F16L 17/073* | (2006.01) | |
| *F16J 15/02* | (2006.01) | |
| *F16L 37/252* | (2006.01) | |

(52) U.S. Cl.
CPC .............. *F16L 23/22* (2013.01); *F16J 15/022* (2013.01); *F16L 17/073* (2013.01); *F16L 37/252* (2013.01)

(58) Field of Classification Search
CPC ....... F16L 23/22; F16L 17/073; F16L 37/252; F16J 15/022
See application file for complete search history.

(56) References Cited

U.S. PATENT DOCUMENTS

| | | | |
|---|---|---|---|
| 1,985,349 | A | 12/1934 | Kelly |
| 2,411,057 | A | 11/1946 | Robbins |
| 3,758,137 | A | 9/1973 | Kershaw |
| 5,779,277 | A | 7/1998 | Street |

FOREIGN PATENT DOCUMENTS

| | | | | |
|---|---|---|---|---|
| AU | | 551172 | 4/1986 | |
| AU | 2002214800 | | 5/2002 | |
| GB | | 1258305 A | * 12/1971 | ............ F16L 17/073 |
| WO | WO 2013/126949 | | 9/2013 | |

OTHER PUBLICATIONS

First Examination Report for Application No. AU 2016250347 dated Sep. 15, 2020, 4 pages.

* cited by examiner

*Primary Examiner* — David Bochna
*Assistant Examiner* — James A Linford
(74) *Attorney, Agent, or Firm* — Neal, Gerber & Eisenberg LLP

(57) ABSTRACT

The present disclosure relates to a seal for a coupling member of a type used in a fluid coupling including mating first and second coupling members. Each coupling member includes a seal cavity with a generally square shaped cross-section including an upper face, a circumferential face and a lower face. The seal includes an upper portion and a lower portion. The lower portion of the seal includes a first part and a second part. The first part of the lower portion of the seal includes an external ledge that extends away from the upper portion of the seal and which is configured during use of the coupling member to contact against the upper face of the seal cavity.

19 Claims, 8 Drawing Sheets

SEAL

PRIORITY CLAIM

This application is a continuation of, claims the benefit of and priority to U.S. patent application Ser. No. 15/348,424, filed on Nov. 10, 2016, which claims the benefit of and priority to Australian Patent Application No. 2015904645, filed on Nov. 11, 2015, the entire contents of which is incorporated by reference herein.

TECHNICAL FIELD

The present disclosure relates to seals for use in components such as couplings. Such seals may also be referred to as sealing gaskets.

BACKGROUND

Australian Patent No. 551172 describes an improved form of fluid coupling including two coupling members or fittings. Each coupling member is arranged to be attached to a hose or the like and to be coupled to the other coupling member. These types of fluid couplings are commonly referred to as claw couplings, cam lock couplings, or quick connect couplings.

Each coupling member has protruding claws configured to engage with the claws of the mating coupling member when attached together. Attachment is typically achieved by rotating the coupling members so that the claws engage a locking flange of the mating coupling member. Each coupling member includes a seal which is compressed when the two coupling members are attached together. The seals are compressed together so as to provide a seal therebetween along a mating seal face and to also provide a seal between each of the coupling members and their respective seal.

A large proportion of such coupling members adopt either an European, Australian or an American/Universal configuration. Such configurations are also respectively identified as Type A, Surelock or Type B configurations. Although the claws of such coupling members are of different shape, the European and American configuration typically include a square profile seal cavity and include a seal that must conform to the square profile cavity during use to ensure a fluid tight seal.

It is recognized that it is difficult to connect these types of couplings due to the nature of the required seal design or configuration which resist compression of the seals which is necessary to enable the mating coupling members to be engaged together. Attempts to address this problem have resulted in the development of a coupling member with a largely semi-circular shaped profile cavity fitted with what is often referred to as a "bellows" type gasket or seal. Australian Patent No. 2002214800 describes a quick connect coupling incorporating coupling members with such shaped cavities and which make use of such "bellows" type seals.

As shown in FIG. 4 of Australian Patent No. 2002214800, each coupling member includes an internal annular recess 10 which has a semi-circular profile. Located within each recess 10 is a seal 12. The seal 12 includes a toroidal portion 20 and a bellows portion 14 connected thereto. The bellows portion 14 terminates in a circumferential sealing bead or ridge 24. A circumferential sealing bead or ridge 26 is also formed at the apex of the bellows portion 14. As explained, there is sufficient resiliency in the bellows portion 14 when the coupling members are connected so that at low pressure the radially outward projecting portion 25 of the bead 24 engages against the surface of the recess 10 and provides sealing for fluid at low pressure. At higher pressure, the pressure forces the bellows portion 24 against the curved surface of the recess 10 and the sealing bead or ridge 26 provides good sealing.

FIG. 4 of Australian Patent No. 200221480 also illustrates the use of a steel reinforcing ring 22 within the toroidal portion 20 of the seal ring 12. The inclusion of the steel reinforcing ring 22 renders replacement of the seal ring 12 by hand virtually impossible. Seal ring 12 replacement requires the use of a dedicated tool.

The seal described in Australian Patent No. 2002214800 is configured to operate in a semi-circular shaped seal cavity and does not function well within a seal cavity with a generally square cross-sectional profile.

The present disclosure seeks to provide a seal that enables relatively easy connection of coupling members fitted with such seals to form a fluid coupling, whilst still maintaining the integrity of the seal of the fluid coupling during use thereof.

The discussion of the background to the disclosure herein is included to explain the context of the disclosure. This is not to be taken as an admission that any of the material referred to was published, known or part of the common general knowledge as at the priority date of this application.

SUMMARY

According to one aspect of the disclosure there is provided a seal for a coupling member of a type used in a fluid coupling including mating first and second coupling members, each coupling member including a seal cavity with a generally square shaped cross-section including an upper face, a circumferential face and a lower face, the seal including:
  an upper portion and a lower portion;
  the lower portion of the seal includes a first part and a second part; and
  the first part includes an external ledge that extends away from the upper portion of the seal and which is configured during use of the coupling member to contact against the upper face of the seal cavity.

In certain embodiments, the second part of the lower portion of the seal includes a generally downwardly extending vane, the vane is movable between a first position wherein a gap is established between a lower face of the upper portion of the seal and an inner face of the vane, and a second positon in which the size of the gap is reduced and wherein the vane is drawn into the seal cavity towards the circumferential face so as to thereby facilitate connection of the mating coupling members as their respective seals are compressed together during engagement of the coupling members to form the fluid coupling.

In accordance with an embodiment of the disclosure, the vane is movable to a third position upon application of an increased compression wherein the gap is eliminated or substantially eliminated. In the third position of the vane, an outer face of the lower portion of the seal is, in certain embodiments, in contact with the circumferential face of the cavity, and an underside of the vane is, in certain embodiments, in contact with the lower face of the seal cavity. In certain embodiments, the external ledge is drawn away from the upper face of the seal cavity. It will thus be appreciated that the vane is arranged to "bend" or "fold" about a "bending" point or zone enabling the lower portion of the seal to more readily move, deform, or to be drawn further into the seal cavity. It will be appreciated that this movement, deformation, or drawing of the lower portion of the seal makes the act of engagement of first and second coupling members together relatively easier. This is because less force is required to be applied to press the first and second coupling members together (against the abutting seals of the two coupling members) and to then twist the coupling members to the locked position thereby establishing the fluid coupling.

A seal according to an embodiment of the disclosure is configured so that when the first coupling member is not connected to the second coupling member to form the fluid coupling, the ledge of the seal in the first coupling member contacts against the upper face of the seal cavity of the first coupling member and the vane contacts against the lower face of the seal cavity. Accordingly, if a flow of fluid is passed through the first coupling member in a direction moving from the lower portion of the seal to the upper portion of the seal, that fluid flow causes the ledge of the seal to press firmly against the upper face of the seal cavity and the vane to press against the lower face of the seal cavity thereby facilitating retention of the seal in the seal cavity of the coupling member. Those skilled in the art will appreciate that the engagement between the ledge of the seal and the upper face of the seal cavity forms an elongate zone of contact. This elongate zone of contact is advantageous as it serves to mitigate against seal 'blow out' from the seal cavity when the coupling member is used as a nozzle on a hose (i.e., the seal is subject to a flow pressure that forces the ledge against the upper face of the seal cavity). The engagement between the ledge of the seal and the upper face of the seal cavity is advantageously established due to the fact that both the ledge and upper face extend generally orthogonally to the longitudinal centre line of the seal which is coincident with the longitudinal centre line of the coupling member.

Those skilled in the art will also appreciate that during use of a fluid coupling, the pressure on the seals fitted in the first and second coupling members increases. Accordingly, when the fluid coupling is in use, the natural tendency of each the seal is to attempt to extrude out of its respective coupling member as flow pressure increases. The vane of a seal in accordance with an embodiment of the disclosure is configured to continue to move and deform as flow pressure through the fluid coupling increases so that the second portion of the seal engages against the lower face and/or the circumferential face of the seal cavity. When the seal is subject to relatively high flow pressures, the lower face of the seal may disengage from the lower face of the seal cavity. However, effective sealing is still maintained because of the contact between the lower portion of the seal and the circumferential face of the seal cavity. In certain embodiments, the lower portion of the seal contours to the shape of the seal cavity.

In certain embodiments, the seal cavity of the coupling member has a square shaped cross-sectional profile.

In certain embodiments, the vane tapers along its length as it moves away from the first part of the second portion and terminates generally at a tip. In certain embodiments, the tip has an underside which is curved. This shape of the tip underside is provided so that when the underside of the tip is in contact with the lower face of the seal cavity, the force applied to the seal is transferred through the curved part of the tip underside effectively ensuring a point type contact. Such a point type contact establishes a relatively high pressure seal because of the low contact area between the vane and the lower face of the seal cavity.

In certain embodiments, the vane when not in use is arranged to curve generally inwardly towards the centre line of the seal so that the tip is located closer to the longitudinal centre line than an external circumferential face of upper portion of the seal. This configuration of the vane facilitates movement of the vane during use in a coupling member.

The vane has an inner side and an outer side. The inner side of the vane is the side that includes the face configured to contact with the upper portion of the seal when the gap is eliminated. In certain embodiments, one or more circumferential beads is located on the outer side of the vane. When the gap is eliminated or substantially eliminated, the one or more circumferential beads are arranged to seal against the circumferential or lower face of the seal cavity. It will be appreciated that when the circumferential bead contacts any part of the sealing cavity, relatively high sealing forces will be established because of the low contact area between the bead and the seal cavity.

Throughout the description and the claims terms such as "upper", "lower", "vertical", "horizontal", "inwardly", and "outwardly" are used to describe the relative positioning and movement of parts of the seal. It should be appreciated that these terms are used in the context of the seal and coupling as illustrated in the drawings.

As referred to herein, "high flow pressure" through the fluid coupling refers to pressures of about 500 to about 1000 PSI. "Working" pressure refers to pressures of about 100 to about 250 PSI. These pressure references are not intended to be limiting but rather indicative of environments that certain embodiments of the disclosure may be required to operate in and the relative difference between those different environments.

The present disclosure also relates to a fluid coupling including a pair of coupling members each fitted with a seal in accordance with an embodiment of the disclosure.

Additional features and advantages are described in, and will be apparent from the following Detailed Description and the figures.

BRIEF DESCRIPTION OF DRAWINGS

Embodiments of the disclosure will now be described, by way of example only, with reference to the accompanying drawings in which:

FIGS. 7A to 7C show a Type A fluid coupling each fitted with seals according to an embodiment of the disclosure. In FIG. 7A the coupling is not subject to any flow pressure, in FIG. 7B the coupling is subject to a working pressure (e.g., 100-250 PSI), and in FIG. 7C the coupling is subject to a high pressure (e.g., 500-1000 PSI);

FIGS. 14A to 14C show Type S fluid couplings each fitted with a seal according to an embodiment of the disclosure. In FIG. 14A the coupling is not subject to any flow pressure, in FIG. 14B the coupling is subject to a working pressure (e.g., 100-250 PSI), and in FIG. 14C the coupling is subject to a high pressure (e.g., 500-1000 PSI).

DETAILED DESCRIPTION

Referring now to the example embodiments of the present disclosure illustrated in FIGS. 1 to 14C, FIGS. 1 to 4 illustrate a seal 10 according to a first embodiment of the disclosure suitable for use with a coupling member 100. Two such mating coupling members 100 can be connected together to form a fluid coupling.

Seal 10 includes an upper portion 20 and a lower portion 30. The lower portion 30 of the seal 10 is arranged in use for receipt within a seal cavity 120 of the coupling member 100. The terms "upper" and "lower" are referred to in the context of the orientation of the seal 10 as depicted in FIGS. 1 to 4.

As best shown in FIGS. 1 to 4, upper portion 20 of the seal 10 adopts a ring like shape and has a planar upper face 22, a circumferential outer face 24, a circumferential inner face 25, and an inner lower face 26. A curved connection joins the circumferential inner face 25 with the inner lower face 26. The upper face 22 and circumferential outer face 24 join substantially at 90° to one another. The upper face 22 of the seal 10 is arranged for sealing engagement with the seal of the mating coupling member of the fluid coupling.

Figure 1:
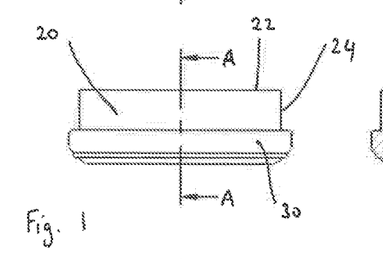
FIG. 1 is a side view of a seal in accordance with an embodiment of the disclosure.
Figure 2:
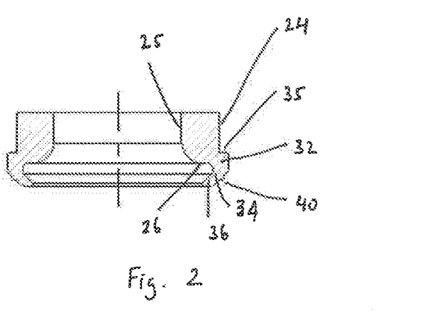
FIG. 2 is a cross-sectional view along centre line A-A as shown in FIG. 1.
Figure 3:
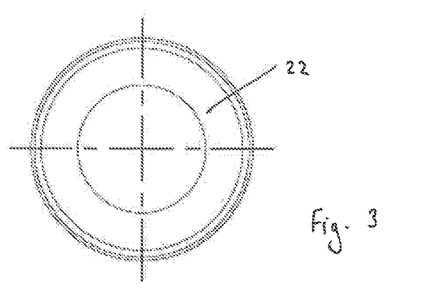
FIG. 3 is a top view of the seal shown in FIG. 1.
Figure 4:
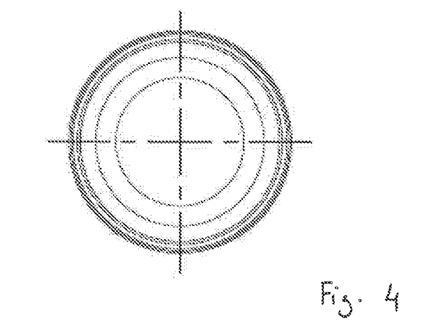
FIG. 4 is a bottom view of the seal shown in FIG. 1.

The upper portion 20 of the seal has a smaller external diameter than the lower portion 30 of the seal 10. As best shown in FIGS. 2 and 5A, the lower portion 30 of the seal 10 includes a first part 32 and a second part 34. The first part 32 of the lower portion 30 extends from the upper portion 20 and includes a flange or an external ledge 35 that extends generally horizontally from the circumferential outer face 24 of the upper portion 20.

The second part 34 of the lower portion 30, which hereafter will be referred to as vane 34, extends generally downwardly away from the first part 32. In certain embodiments, the vane 34 tapers along its length as vane moves away from the first part 32 and terminates generally at a tip 36. The underside of the tip 36 is curved as it extends to the tip 36. Vane 34 curves generally inwardly from the first part 32 so that when the seal 10 is not under compression the tip 36 is located closer to the longitudinal centre line A-A of the seal 10 than the circumferential outer face 24 of the upper portion 20 of the seal 10.

The vane 34 includes an outer side 34A and an inner side 34B. A circumferential bead 40 is located on the outer side 34A of the vane 34 distal from the tip 36. FIG. 5A better illustrates the vane 34.

A gap 400 (FIG. 5A) is established between the inner lower face 26 of the upper portion 20 of the seal 10 and the inner face 34B of the vane 34 of the seal 10. As will be explained in more detail later, gap 400 is provided to facilitate easy engagement between a mating pair of coupling members 100 of a fluid coupling.

Figure 5:
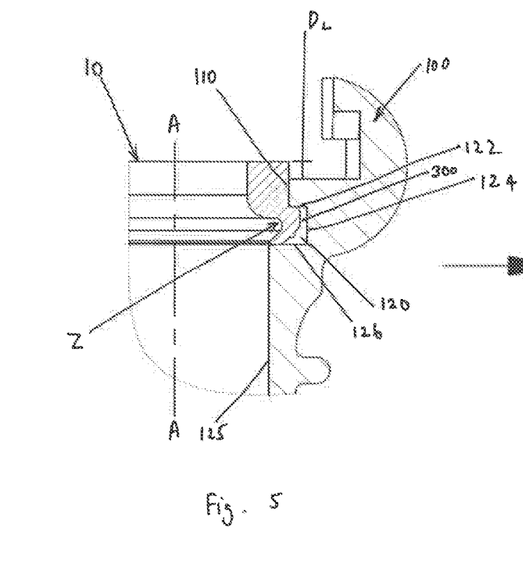
FIG. 5 is a part cross-sectional view showing the seal of FIG. 1 positioned within a Type A coupling member and shown as it would appear when not coupled to a mating Type A coupling member.
Figure 5A:
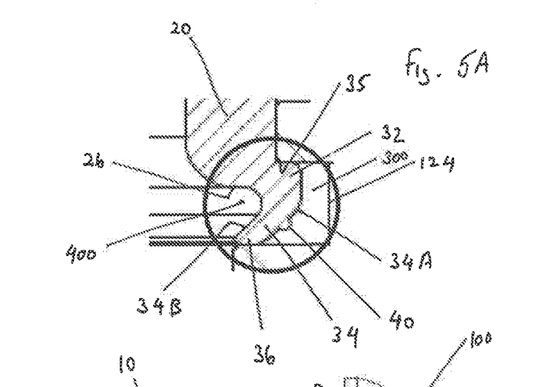
FIG. 5A is an enlarged view of a part of FIG. 5.

FIG. 5 illustrates a partial cross-sectional view showing the seal 10 positioned within the female Type A coupling member 100. The seal 10 is shown as it would appear when the illustrated coupling member 100 is not connected to a mating coupling member to form a fluid coupling. In contrast, FIG. 6 illustrates the seal 10 as it would appear when subject to maximum compression established to enable connection to a mating male Type A coupling member to form a fluid coupling.

Figure 6:
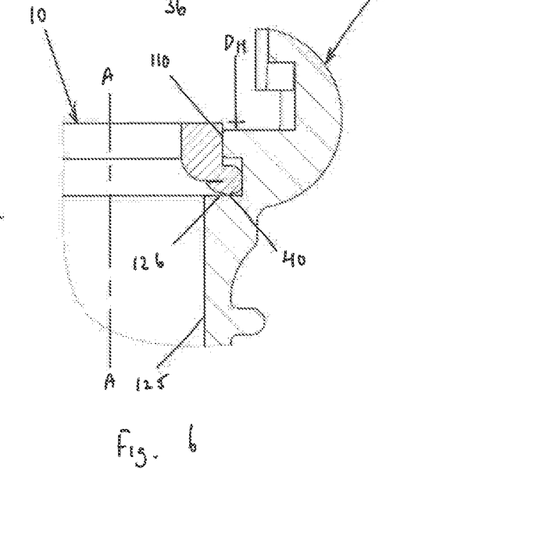
FIG. 6 is a view similar to FIG. 5 but with the seal shown as it would appear when subject to maximum compression established to enable connection to a mating coupling member (not shown) to form a fluid coupling.

As shown in FIGS. 5 and 6, the female coupling member 100 includes a bore with a first diameter opening defined by circumferential wall 110, the seal receiving cavity 120, and a second diameter opening defined by circumferential wall 125. The seal receiving cavity 120 has an upper face 122, a circumferential face 124 and a lower face 126. The upper and lower faces 122, 126 of the seal receiving cavity 120 extend orthogonally to the circumferential face 124 to establish a seal receiving cavity 120 with a generally square cross-sectional profile.

When the seal 10 is fitted into the coupling member 100, the circumferential face 24 of the upper portion 20 of the seal 10 is contained within the circumferential wall 110 of the coupling member 100. The external ledge 35 of the seal 10 engages against the upper face 122 of the cavity 120, and the tip 36 of the vane 34 engages against the lower face 126 of the cavity 120 (FIG. 5). The tip 36 of the vane 34 is curved so as to normally only make point contact with the lower face 126 of the cavity 120. However, during use of the seal 10 in a fluid coupling, and as pressure on the seal 10 increases due to fluid flow through the fluid coupling, there may be one or more points or zones of contact.

As best shown in FIG. 5A, there is a gap 300 between the lower portion 30 of the seal 10 and the circumferential face 124 of the cavity 120. Gap 400 between the inner lower face 26 of the upper portion 20 of the seal 10 and the inner face 34B of the vane 34 of the seal 10 is also present.

When the seal 10 is fitted into the coupling member 100, the engagement between the external ledge 35 of the seal 10 against the upper face 122 of the cavity 120 helps to prevent the seal 10 from inadvertently 'blowing out' of the seal cavity 120. It will be noted that both the external ledge 35 of the seal 10 and the upper face 122 of the cavity 120 extend orthogonally to the longitudinal centre line A-A of the seal 10 which is coincident with the longitudinal centre line of the coupling member 100 and fluid coupling when established. Seal 'blow out' is a common problem when a hose fitted with such a coupling member 100 is not connected to another coupling member 100. This may occur when a hose fitted with such a coupling member 100 is used to spray water or other fluids (i.e., when the coupling member 100 is used as a nozzle). When certain known prior art seals are fitted in such a coupling member 100 they are relatively easily blown out of the coupling member 100 by the action of the fluid flow.

When the seal 10 is located within the seal cavity 120 as shown in FIG. 5, without any substantive compression applied, gap 400 is close to its maximum dimension. It will be appreciated that the seal 10 will be subject to some compression when located in the coupling member 100 as shown in FIG. 5 due to the engagement between the lower part 30 of the seal 10 and the seal cavity 120.

Those skilled in the art will appreciate that when two mating coupling members 100 of a fluid coupling are to be connected together, it is necessary to force them together against the abutting seals 10 before twisting the coupling members 100 to engage and lock them together. This requires compression of the seals 10 (i.e., upper face 22 of one seal 10 is pressed against the upper face 22 of the other seal 10) and causes the gap 400 of each seal 10 to be reduced as the vane 34 is pressed against the lower portion 126 of the respective seal cavity 120. This gap reduction is facilitated by the configuration of the vane 34, and more particularly the configuration of the tip 36, which enables the tip 36 to move across, or more particularly, "roll" upon, the lower face 126 of the cavity 120 as the two coupling members 100 are joined together. The seals 10 "bend" or "fold" about their respective "bending" point or zone Z shown in FIG. 5 to reduce the dimension of the gap 400. This movement of the tip 36 and reduction in the size of the gap 400 enables relatively easier connection of the two mating coupling members 100 of the fluid coupling compared to when certain known prior art seals are fitted in the coupling members.

When the seal 10 is located in the cavity 120 as shown in FIG. 5 without any substantive compression applied, the amount of seal 10 protruding out of the upper part of the bore in the coupling member 100 is shown as DL. In contrast, when the seal 10 is subject to maximum compression as shown in FIG. 6, as occurs when two mating coupling members 100 are forced together with maximum compression during connection to form the fluid coupling, the amount of seal 10 protruding out of the bore of the coupling member 100 is shown as DH. As noted, DL is greater than DH.

The compression forces necessarily applied to each seal 10 during connection of the two mating coupling members 100 is such that the lower portion 30 of each seal 10 resiliently deforms. The seal 10 deforms so that the first part 32 and vane 34 are drawn further into the cavity 120 of the coupling member 100. As this occurs, the tip 36 of the vane 34 moves generally across the lower face 126 (i.e., away from the centre line A-A) enabling the lower portion 30 of the seal 10 to effectively "fold" over itself, generally contouring to the shape of the seal cavity 120, and reducing or eventually eliminating the gap 400 between the inner lower face 26 of the upper portion 20 of the seal 10 and the inner face 34B of the vane 34. This configuration of the seal 10 is shown in FIG. 6.

FIG. 6 also shows how the circumferential bead 40 is now pressed against the lower face 126 of the cavity 120. The seal 10 is subject to maximum compression enabling more easy relative rotation of the two coupling members 100 to establish a connection therebetween.

Figure 7A:
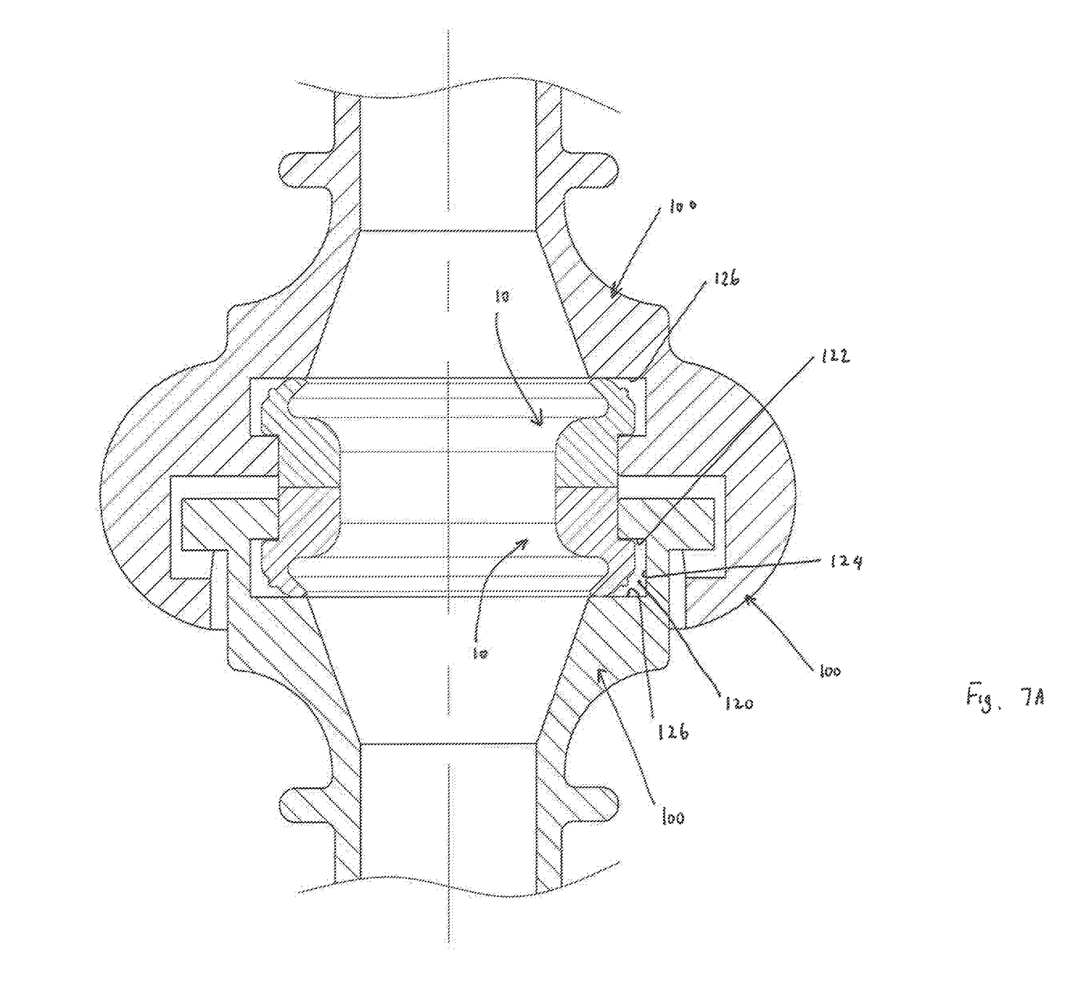

Once the connection between the mating Type A coupling members 100 is achieved, a fluid coupling is established as shown in FIG. 7A. The compression on the two seals 10 of the flow coupling is reduced once the coupling members are engaged together and each seal 10 returns to a configuration more similar to that shown in FIG. 5. This is shown in FIG. 7A where the established fluid coupling is not subject to any flow pressure through the coupling. FIG. 7A also shows that the external ledge 35 is sized so that there is a substantial zone of contact between the ledge 35 and the upper face 122 of the seal cavity 120. It will be noted, that as illustrated, the ledge 35 and thus the zone of contact is at least half the width of the width of the upper face 122 of the seal cavity 120.

Figure 7B:
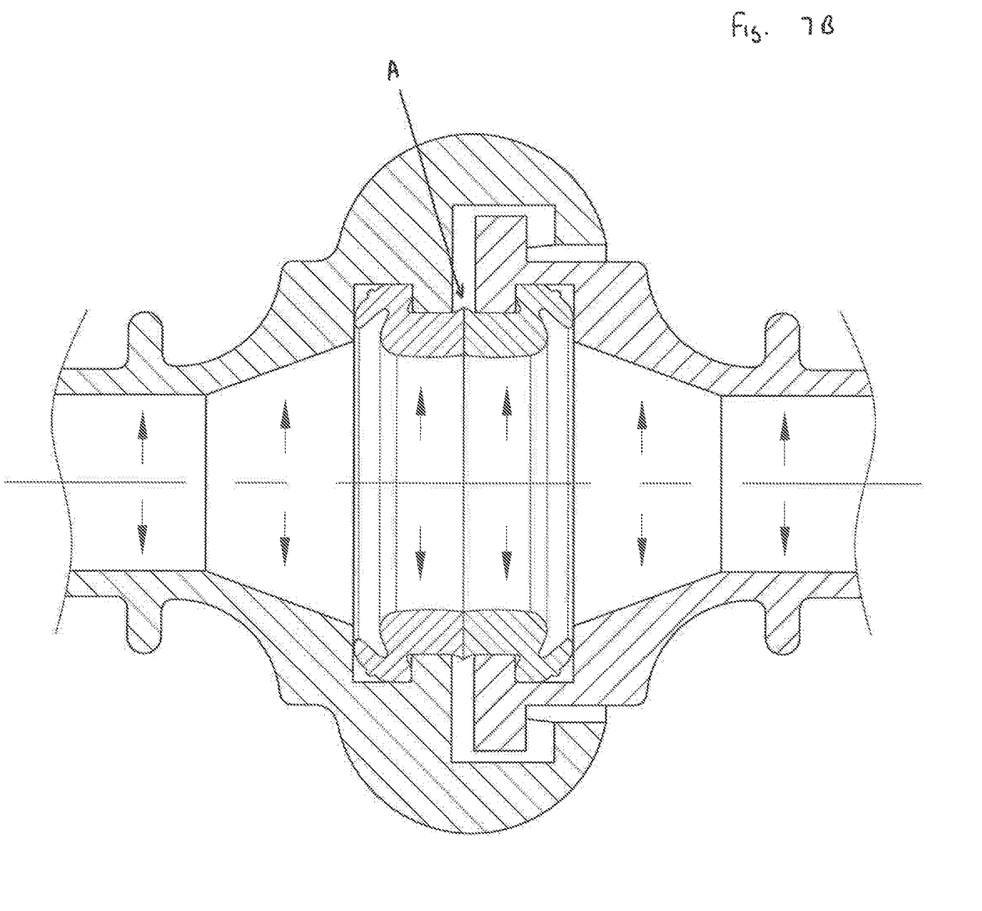
Figure 7C:
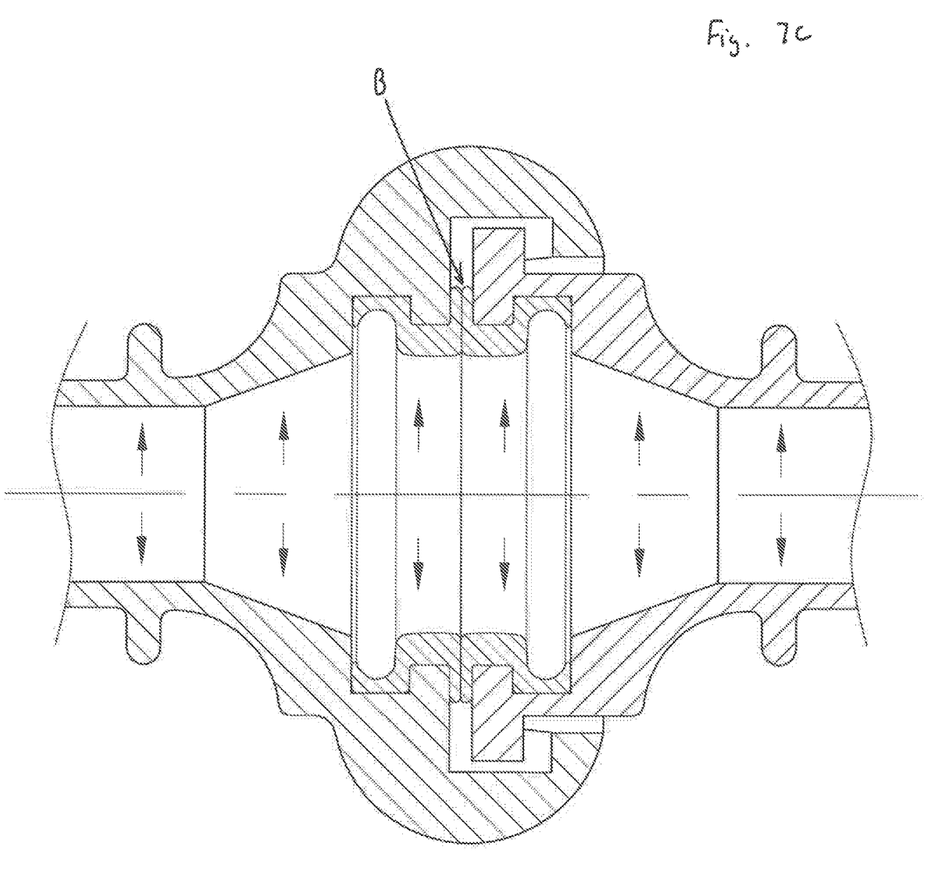
Figure 8:
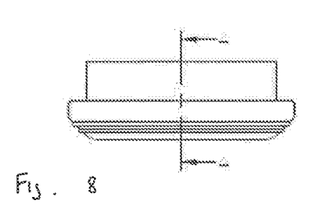
FIG. 8 is a side view of a seal in accordance with another embodiment of the disclosure.
Figure 9:
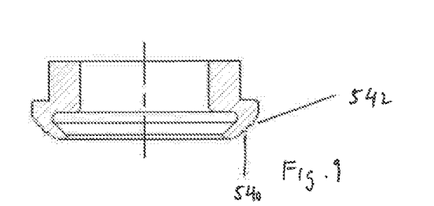
FIG. 9 is a cross-sectional view along centre line A-A as shown in FIG. 7.
Figure 10:
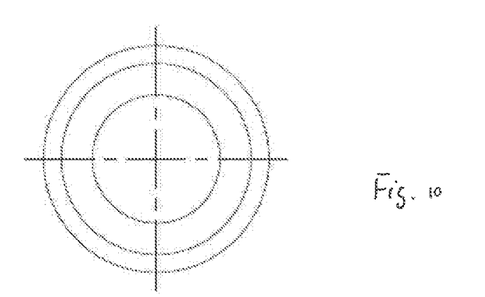
FIG. 10 is a top view of the seal shown in FIG. 8.
Figure 11:
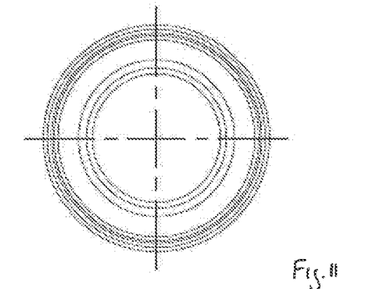
FIG. 11 is a bottom view of the seal shown in FIG. 8.

During use of the fluid coupling, the seals 10 within each of the coupling members 100 will be subject to increased pressure due to fluid flow. This pressure is indicated by the arrows in FIGS. 7B and 7C. When subject to a normal working pressure (e.g., about 100-about 250 PSI) as shown in FIG. 7B, the lower portion 30 of the seal 10 will expand and push further into the cavity 120 ultimately eliminating the gap 300 between the seal 10 and the circumferential face 124 of the cavity 120, and also any gap between the seal 10 and the upper face 122 of the cavity 120. When the seal 10 is subject to high pressure (e.g., about 500-about 1000 PSI) as shown in FIG. 7C, the circumferential bead 40 is either pressed firmly in contact with either the lower face 126 or the circumferential face 124 of the cavity 120. As the seal 10 is under increased pressure, the circumferential bead 40 pressure loading is high, thus providing a very effective circumferential seal against the lower face 126 or circumferential face 124 of the sealing cavity 120.

FIGS. 7B and 7C also illustrate how the increasing pressure on the seals 10 results in the upper most part of each seal 10 being increasingly forced outwardly between the connected coupling members 100 (see area identified by arrows A and B). FIG. 7C illustrates the approximate maximum outward movement of the upper part of the respective seals 10 before they would actually 'blow out' of the fluid coupling. If the seals 'blow out', sealing of the fluid coupling will fail.

Figure 12:
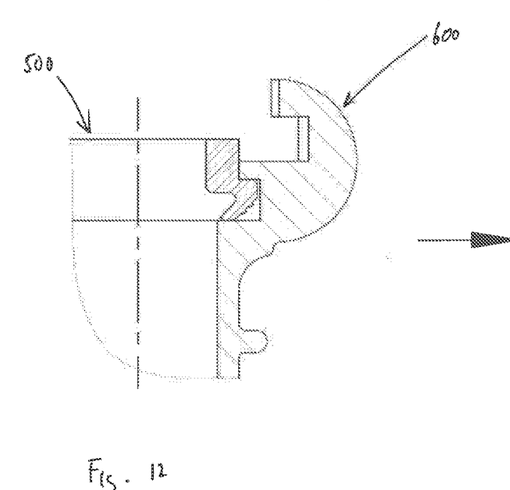
FIG. 12 is a part cross-sectional view showing the seal of FIG. 8 positioned within a Type S coupling member and shown as it would appear when not coupled to a mating Type S coupling member.
Figure 13:
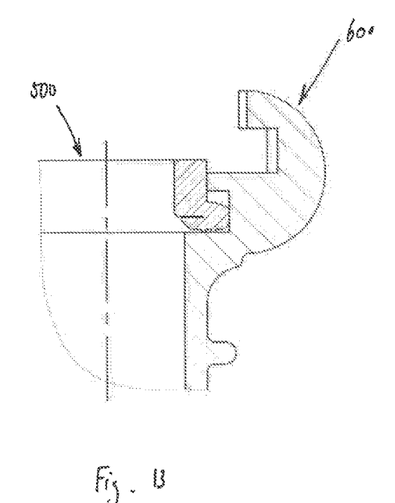
FIG. 13 is a view similar to FIG. 12 but with the seal shown as it would appear when subject to maximum compression established to enable connection to a mating coupling member (not shown) to form a Type S fluid coupling.

FIGS. 8 to 11 illustrate a seal 500 according to a second embodiment of the disclosure. FIGS. 12 and 13 show the seal 500 mounted within a female Type S coupling member 600.

Seal 500 is substantially identical to the seal 10. However, it will be noted that the seal 500 includes two circumferential sealing beads 540, 542 whereas the seal 10 only included a single circumferential sealing bead 40. The inclusion of two sealing beads 540, 542 provides a "back up" seal in the event that one of the sealing beads fails. Further, it is envisioned that the two sealing bead configuration may only be used for seals suitable for use in an Australian (S Type) coupling member 600 and thus the identification by a user that the seal 500 has two beads would alert them to the suitability of such a seal 500 in such a coupling member 600. This may prevent the wrong sized seal from being accidentally fitted into a coupling member.

Those skilled in the art will know that the S Type coupling has small (10 mm-32 mm), medium (40 mm-50 mm), and large (80 mm) head design or configuration. The two beads will aid in sealing of the generally larger coupling member head designs or configurations only found in the S type couplings.

Figure 14:
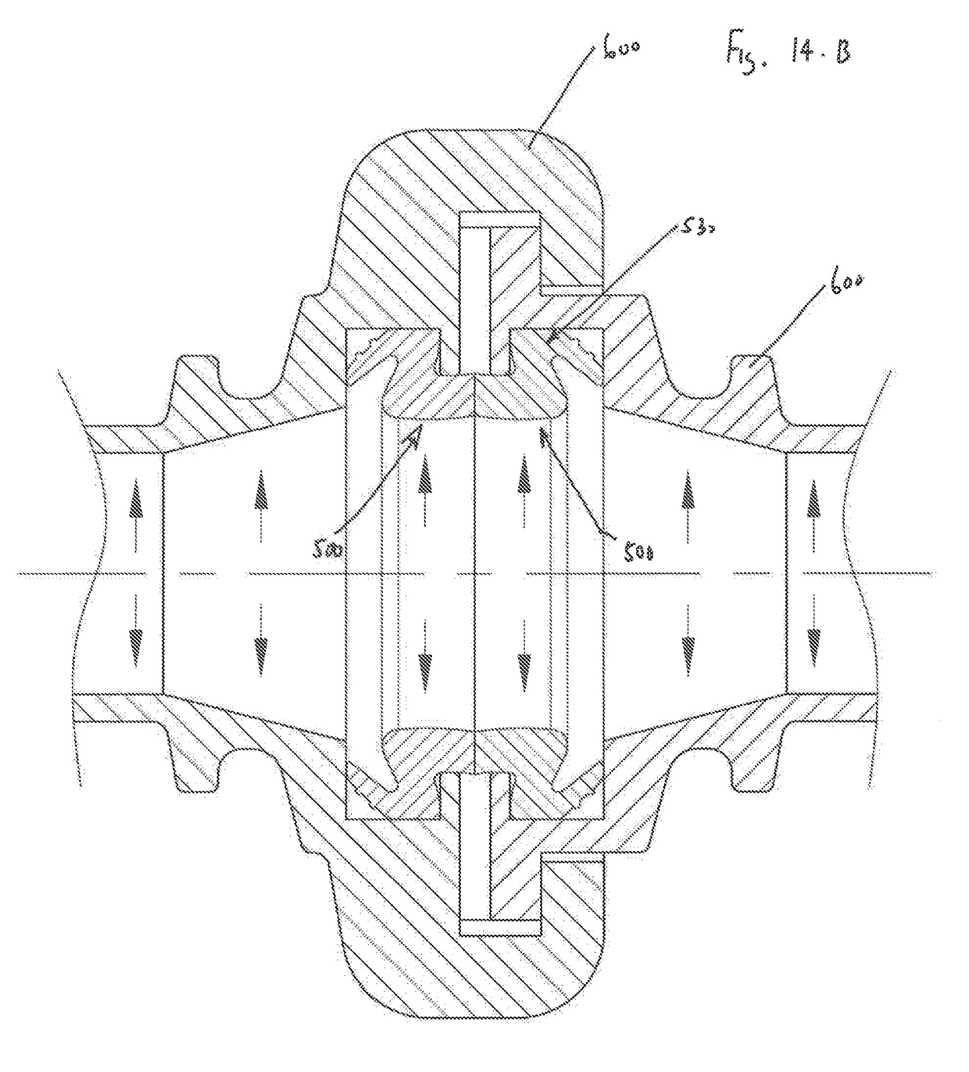
Figure 14A:
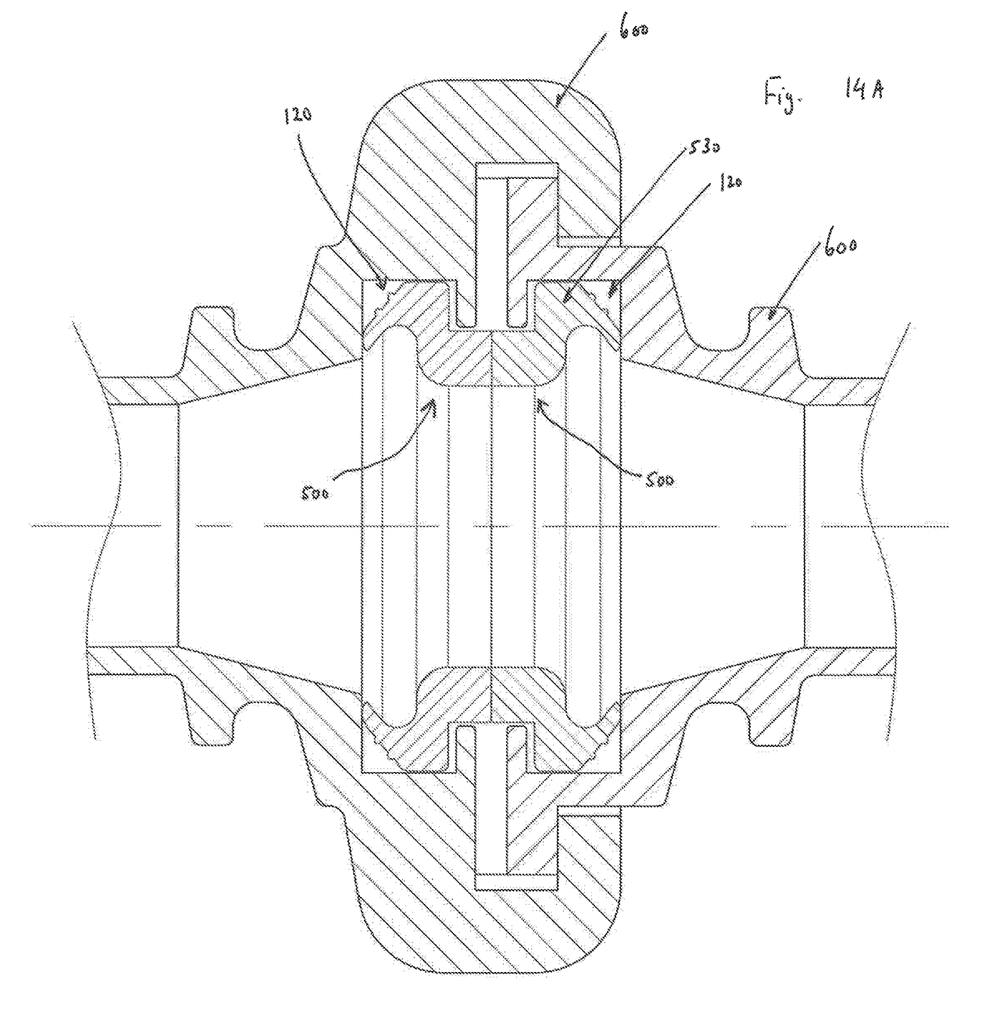
Figure 14C:
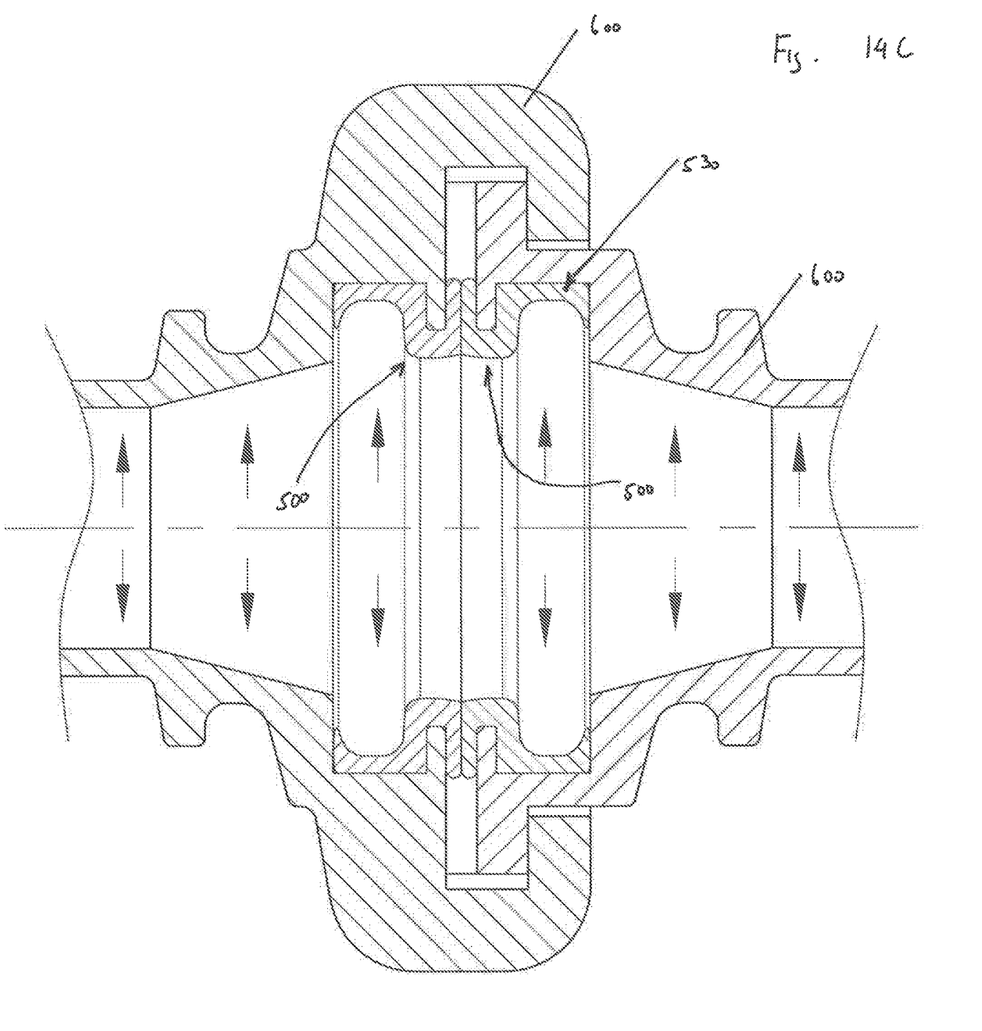

FIGS. 14A to 14C respectively show the Type S fluid coupling when not subject to any flow pressure, when subject a normal working pressure (e.g., about 100-about 250 PSI), and when subject to high pressure (e.g., about 500-about 1000 PSI). These Figures clearly illustrate how the lower portion 530 of the seal 530 is drawn into the seal cavity 120 as the flow pressure through the coupling member increases. At high pressure, the lower portion 530 of the seal substantially contours to the shape of the seal cavity (FIG. 14C).

It is envisioned that a seal in accordance with an embodiment of the disclosure may include one or more such sealing beads.

A seal in accordance with an embodiment of the disclosure may be made from a wide range of materials, for example a suitable plastic material or rubber compound. It is envisioned that the material of the seal should be selected to control expansion of the material under varying pressure. In certain embodiments, the material is nitrile butadiene (NBR) because of its ability to maintain a level of rigidity when under pressure. In other embodiments, materials include fluoroelastomers (FKM), ethylene propylene diene monomer (EPDM), and silicon (Si).

Although embodiments of the disclosure have been described with reference to seal cavities of square cross-sectional profile, it is envisioned that the disclosure has broader application. As such, seal in accordance with an embodiment of the disclosure may also be used in seal cavities of curved cross-sectional profile It is envisioned that a seal according to an embodiment of the disclosure will facilitate the connection of coupling members to form a fluid coupling because the gap between the vane and upper portion of the seal is relatively easy to reduce enabling the seal to relatively more easily move into the sealing cavity thus reducing the dimension of the seal protruding from the upper part of the bore of the coupling member.

It is also envisioned that a seal according to an embodiment of the disclosure will facilitate strong sealing even if relatively low pressure environments because of the engagement between the tip of the vane and the lower face of the seal cavity. The pressure applied to the seal will be concentrated through the relatively small contact area of the tip thereby providing a strong seal between the tip and seal cavity.

It is also envisioned that in situations where a hose fitting with a coupling member is used to disperse a fluid, the engagement between the ledge of the seal and the upper face of the seal cavity will minimise the risk of seal "blow out".

It is also envisioned that embodiments of the disclosure can be relatively easily inserted and removed from coupling members by hand and without the use of a dedicated tool. This enables seals in accordance with an embodiment of the disclosure to be retrofitted into couplings relatively easily and without any special equipment.

The embodiments have been described by way of example only and modifications within the spirit and scope of the disclosure are envisioned. As such, changes may be made to the embodiment described of the present disclosure without, however, departing from the protective scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A coupling member for use in a fluid coupling, the coupling member comprising:
a removable seal in a seal cavity defining a square shaped cross-section including an upper face, a circumferential face and a lower face, the removable seal comprising an upper portion, and a lower portion including a first part including an external ledge that extends perpendicularly away from the upper portion and generally parallel to the upper face defined by the seal cavity, the external ledge being configured, during use of the coupling member, to contact against the upper face defined by the seal cavity of the coupling member, and a second part including a generally downwardly extending vane, wherein a length of the vane tapers away from the first part of the lower portion of the removable seal and terminates at a tip and the vane is configured to bend about a zone when at least one of: (i) the removable seal is subject to compression during an engagement with a mating coupling member to form the fluid coupling, and (ii) the fluid coupling is subject to a flow pressure as fluid flows through the fluid coupling.

2. The coupling member of claim 1, wherein the vane is movable to:
a first position wherein a gap is established between a lower face of the upper portion of the removable seal and an inner face of the vane, and
a second position in which a size of the gap is reduced, wherein the vane is drawn into the seal cavity towards the circumferential face to facilitate a connection of a mating coupling member to form the fluid coupling.

3. The coupling member of claim 2, wherein the vane is movable to a third position wherein the gap is substantially eliminated.

4. The coupling member of claim 3, wherein in the third position, an outer face of the lower portion of the removable seal is in contact with the circumferential face.

5. The coupling member of claim 3, wherein in the third position, an underside of the vane is in contact with the lower face defined by the seal cavity and the external ledge is drawn away from the upper face defined by the seal cavity.

6. The coupling member of claim 2, wherein when the gap is reduced, the lower portion of the removable seal contours to the shape defined by the seal cavity.

7. The coupling member of claim 1, wherein the tip has a curved underside.

8. The coupling member of claim 7, wherein the curved underside of the tip is configured in use to contact against one of: the lower face defined by the seal cavity, and the circumferential face defined by the seal cavity.

9. The coupling member of claim 1, wherein the vane, when not in use, curves inwardly towards a centre line whereby a distal most end of the vane is located closer to the centre line than an external circumferential face of the upper portion of the removable seal.

10. The coupling member of claim 1, wherein when not mating with a mating coupling member, the external ledge of the first part of the lower portion of the removable seal contacts against the upper face defined by the seal cavity and the vane contacts against the lower face defined by the seal cavity so that if a flow of fluid is passed in a direction moving from the lower portion of the removable seal towards the upper portion of the removable seal, the fluid flow causes the external ledge to press against the upper face defined by the seal cavity and the vane to press against the lower face defined by the seal cavity to retain the removable seal in the seal cavity.

11. The coupling member of claim 1, wherein when not mating with a mating coupling member, the external ledge contacts against the upper face defined by the seal cavity to establish an elongate zone of contact.

12. The coupling member of claim 1, wherein the external ledge has a width at least half the width of the upper face defined by the seal cavity.

13. The coupling member of claim 1, which made from any of a nitrile butadiene, a fluoroelastomers, an ethylene propylene diene monomer, and a silicon.

14. A coupling member for use in a fluid coupling, the coupling member comprising:
a removable seal in a seal cavity defining a square shaped cross-section including an upper face, a circumferential face and a lower face, the removable seal comprising an upper portion, and a lower portion including a first part including an external ledge that extends perpendicularly away from the upper portion and generally parallel to the upper face defined by the seal cavity, the external ledge being configured, during use of the coupling member, to contact against the upper face defined by the seal cavity of the coupling member, and a second part including a generally downwardly extending vane, wherein a length of the vane tapers away from the first part of the lower portion of the removable seal and terminates at a tip and the vane is movable to: a first position wherein a gap is established between a lower face of the upper portion of the removable seal and an inner face of the vane, and a second position in which a size of the gap is reduced, wherein the vane is drawn into the seal cavity towards the circumferential face to facilitate a connection of a mating coupling member to form the fluid coupling.

15. The coupling member of claim 14, wherein the vane is movable to a third position wherein the gap is substantially eliminated.

16. The coupling member of claim 15, wherein in the third position, an outer face of the lower portion of the removable seal is in contact with the circumferential face.

17. The coupling member of claim 15, wherein in the third position, an underside of the vane is in contact with the lower face defined by the seal cavity and the external ledge is drawn away from the upper face defined by the seal cavity.

18. The coupling member of claim 14, wherein when the gap is reduced, the lower portion of the removable seal contours to the shape defined by the seal cavity.

19. A coupling member for use in a fluid coupling, the coupling member comprising:

a removable seal in a seal cavity defining a square shaped cross-section including an upper face, a circumferential face and a lower face, the removable seal comprising an upper portion, and a lower portion including a first part including an external ledge that extends perpendicularly away from the upper portion and generally parallel to the upper face defined by the seal cavity, the external ledge being configured, during use of the coupling member, to contact against the upper face defined by the seal cavity of the coupling member, and a second part including a generally downwardly extending vane, wherein a length of the vane tapers away from the first part of the lower portion of the removable seal and terminates at a tip and when not mating with a mating coupling member, the external ledge of the first part of the lower portion of the removable seal contacts against the upper face defined by the seal cavity and the vane contacts against the lower face defined by the seal cavity so that if a flow of fluid is passed in a direction moving from the lower portion of the removable seal towards the upper portion of the removable seal, the fluid flow causes the external ledge to press against the upper face defined by the seal cavity and the vane to press against the lower face defined by the seal cavity to retain the removable seal in the seal cavity.

* * * * *